Gissinger & Kellberg,
Converting Motion.

N° 16,303.    Patented Dec. 23, 1856

UNITED STATES PATENT OFFICE.

SAMUEL GISSINGER AND JOHN W. KELLBERG, OF ALLEGHENY, PENNSYLVANIA, ASSIGNORS TO D. A. MORRIS, OF PITTSBURGH, PENNSYLVANIA.

CONVERTING RECIPROCATING INTO ROTARY MOTION.

Specification of Letters Patent No. 16,303, dated December 23, 1856.

*To all whom it may concern:*

Be it known that we, SAMUEL GISSINGER and JOHN W. KELLBERG, of Allegheny City, in the county of Allegheny and State of Pennsylvania, have invented a new and useful Contrivance for Converting Reciprocating Rectilinear into Rotary Motion, and Vice Versa; and we do hereby declare that the following is a full, clear, and exact description of the same, reference being had to the accompanying drawings, forming part of this specification, in which—

Figure 1:
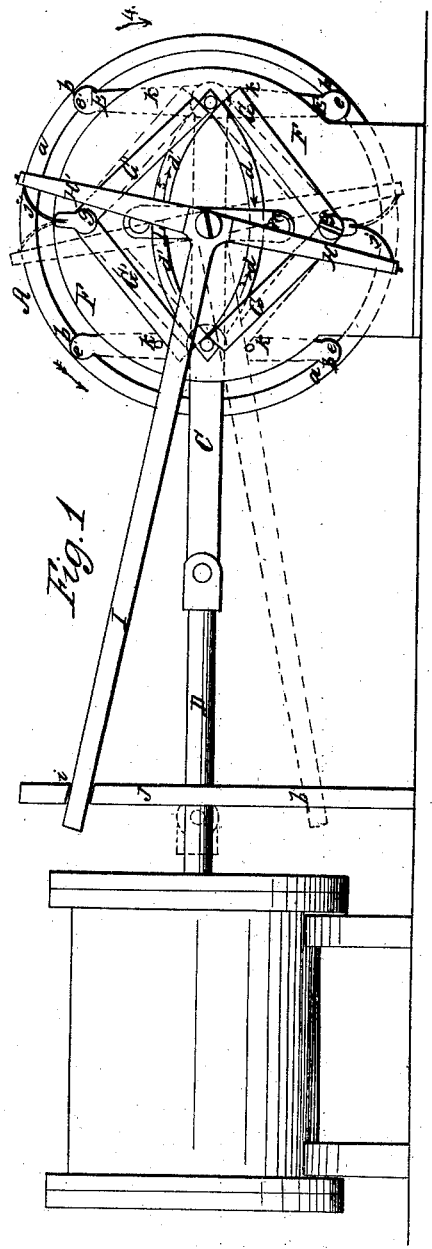
Figure 2:
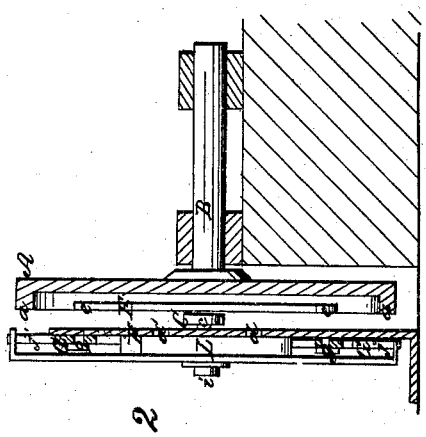

Figure 1 is a side view of the contrivance applied, as a substitute for the crank, to a reciprocating steam-engine. Fig. 2 is a section of the same in a plane passing through the center of the engine shaft.

Similar letters of reference indicate corresponding parts in both figures.

A is a disk or wheel secured to one end of the engine shaft B, having a concentric rim, $a$, projecting at a right angle from one side beyond the end of the shaft.

C is a vibrating rod of similar character to a pitman, attached to the piston rod D, of the engine, and working as close as possible to the rim $a$, of the wheel A.

E is a bar having its ends finished off to a circular form as shown at $e$, $e'$, Fig. 1, the length of the said bar between the centers of the circles $e$, $e'$, being just equal to the length of the reciprocating movement or stroke of the piston. This bar is pivoted at the center of its length to the extremity of the rod C.

$b$, $b$, $b$, $b$, are semicircular notches formed in the interior of the rim $a$, of the wheel A, at four equidistant points, to receive the circular-formed ends of the bar E. It must be observed that the circle of the interior of the rim $a$, must be of such circumference as to circumscribe a square the length of whose sides is equal to the length of the stroke of the piston, and hence the distances between the centers of the notches $b$, $b$, $b$, $b$, are equal to the said length of stroke.

F is a stationary plate or standard secured to any suitable foundation and standing parallel with the wheel A, in such proximity thereto that there is just room enough for the rod C to work between them. This plate or standard contains a double arc formed slot $d$, $d'$, the central line of which is described with the same radii as the circle of the interior of the rim $a$, of the wheel A, and the united arcs $d$, $d'$ of which meet in a line which occupies the same imaginary plane as the axis of the shaft B. The distance between the points of meeting of the two arcs, taken in a straight line is just equal to the length of stroke of the piston. This slot receives a prolongation of the pin $c$, which forms the pivot connecting the bar E, to the rod C. This prolongation of the pin $c$, protrudes some distance, through the slot. The portion of the plate or standard surrounded by the slot $d$, $d$, is represented as being secured to the outer portion by a rigid connecting piece L, attached by screws $m$, $m$, to the outer face of the plate or standard.

G, G', are two bent levers pivoted to the plate F, by stationary pins $g$, $g'$, which stand at equal distances from the slot $d$, $d'$, on opposite sides of it, the centers of the said pins $g$, $g'$, being both in an imaginary line which is perpendicular to and bisects a straight line drawn between the points of meeting of the arcs of the slot. The above-named levers G, G', are allowed such a motion that points near the two ends of each will just move back and forth across the slot $d$, $d'$, said motion being limited by stationary pins K, K, secured in the plate or standard F.

H, H, I, is a three-armed lever working on a pin $i$, which is secured in the center of that portion of the plate or standard F, which is surrounded by or included within the slot $d$ $d'$. The arms H, H, of this lever receive in slots at their ends two small springs $j$, $j'$, which are attached to the levers G, G'. The arm I, of the said lever serves as a handle by which to move the arms H, H, to one side or the other of the pins $g$, $g'$, and thus cause the ends of the levers G, G', to stand over one or the other end of the arc-shaped portions $d$ and $d'$, of the slot $d$, $d'$. By placing the arm I, in one or the other of two notches $l$, $l'$, in a standard J, both of which positions are shown in Fig. 1, one by black and the other by red outlines, the arms H, H', are caused, by their action on the springs $j$, $j'$, to throw the levers G, G, into one or other of the positions above referred to, which are shown in Fig. 1 in black and red outline to correspond with the lever H, H, I.

The object of the above mentioned change of position of the parts is to cause the wheel A, and the shaft B, to rotate in one or the other direction at pleasure.

The operation of the apparatus is as follows. Motion being transmitted to the piston rod causes the rod C, to drive the pin c, along the slot d, d', and one end of the bar E, entering into one of the notches in the rim a, of the wheel A is caused to turn the said wheel on its axis, the bar being confined in the notch by the working of the pin c, in the slot d, d', the arcs of which are both parallel with the inner circumference of the rim a. While the pin c, moves from end to end of one arc of the slot, the wheel makes exactly one-fourth of a revolution. After moving along one arc of the slot the pin c, is prevented going back in the same arc by means of the levers G, G', and caused to pass along the other arc by which means the continuous circular motion of the wheel A is produced.

To explain the action of the levers G, G', and the bar E, let it be first supposed that the several parts of the apparatus are in the condition represented in black outline in Fig. 1. The piston rod is supposed to have just completed its movement to the right and to be about to return, and as the pin c, cannot move along the arc d', by reason of the lever G' covering the entrance thereto it is compelled to pass along the arc d, in the direction of the black arrow 3, shown therein, and the end e, of the bar E, entering into notch b, turns the wheel A in the direction of the black arrow 4 shown near it. As the pin c, approaches the other extremity of the arc d, it pushes aside the lever G, which stands across the slot, but as soon as it arrives at the junction of the arcs d and d', it passes the end of the lever G, which is instantly thrown across the slot, by the spring j, so as to prevent its return and compel it to move along the arc d' when the piston commences to move to the right. The bar E is now supposed to occupy the portion indicated in red outline, its end e', having entered the next notch b, in advance of that occupied by the end e. As the piston moves to the right and the pin c, moves along the arc d', as indicated by the arrow 5, the end e, of the bar E, leaves the notch it has occupied and the end e' remaining engaged with the next one and thus continues the movement of the wheel A, in the direction of the arrow 4. As the pin c, approaches the end of the arc d', it pushes aside the lever G', which as the pin arrives at the right hand junction of that arc with d, is thrown behind it by the spring j', and prevents its return compelling it, as the piston again moves to the right, to move in the arc d. In the above manner the several movements are repeated, giving a continuous rotation to the wheel A, and shaft B. By shifting the lever I, from the notch l, to the notch l', as shown in red outline in Fig. 1, the levers G, G, are thrown across the opposite ends of the arcs d, d', of the slot and the pin c, is prevented moving in any other direction than that indicated by the red arrows 6, and 7, thus compelling the wheel A to rotate in the direction of the red arrow 7, the action of the bar E, being in this case precisely the reverse of that previously described.

The application of our invention to any other machinery is made substantially in the same manner as to the steam engine. By turning the disk A, a reciprocating movement may be produced on any device connected with the rod C, and confined within a right line like the piston rod D.

What we claim as our invention and desire to secure by Letters Patent is—

The combination of the disk A, having an externally notched rim a, and being attached to the shaft to be rotated, the standard F, or its equivalent containing a double arc-formed slot d, d, the bar E, that is connected by a vibrating rod C with the piston rod or other reciprocating object, the pin c, the levers G, G, and springs j, j, the whole operating substantially as, and for the purpose herein specified.

SAMUEL GISSINGER.
JOHN W. KELLBERG.

Witnesses:
ROBERT L. COLTART,
AND. MCMASTER.